US008971619B2

(12) United States Patent
Wang et al.

(10) Patent No.: US 8,971,619 B2
(45) Date of Patent: Mar. 3, 2015

(54) METHOD AND A DEVICE FOR EXTRACTING COLOR FEATURES

(71) Applicant: NEC (China) Co., Ltd., Beijing (CN)

(72) Inventors: Feng Wang, Beijing (CN); Shaopeng Tang, Beijing (CN); Hongming Zhang, Beijing (CN); Wei Zeng, Beijing (CN); Guoyi Liu, Beijing (CN); Qingyuan Wang, Beijing (CN); Lei Qin, Beijing (CN); Qingming Huang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 103 days.

(21) Appl. No.: 13/742,949

(22) Filed: Jan. 16, 2013

(65) Prior Publication Data

US 2013/0251252 A1    Sep. 26, 2013

(51) Int. Cl.
*G06K 9/00*    (2006.01)
*G06K 9/46*    (2006.01)

(52) U.S. Cl.
CPC ............ *G06K 9/4652* (2013.01); *G06K 9/4642* (2013.01)
USPC ........................................................ 382/165

(58) Field of Classification Search
None
See application file for complete search history.

(56) References Cited

U.S. PATENT DOCUMENTS

| | | | |
|---|---|---|---|
| 2007/0098274 A1* | 5/2007 | Ibrahim et al. | 382/233 |
| 2012/0294514 A1* | 11/2012 | Saunders et al. | 382/159 |
| 2013/0064446 A1* | 3/2013 | Itoh | 382/165 |

OTHER PUBLICATIONS

Dalal et al., "Histogram of oriented gradients for human detection," 18th IEEE Conf. Computer Vision and Pattern Recognition, vol. 1, pp. 886-893(2005).*
Dollár, P., et al. "Integral Channel Features" British Machine Vision Conference, BMVC 2009. Sep. 2009. pp. 1-11.
Schwartz, W., et al. "Human Detection Using Partial Least Squares Analysis" IEEE 12th International Conference on Computer Vision. Sep. 2009. (8 Pages).
Walk, S., et al. "New Features and Insights for Pedestrian Detection" The Twenty-Third IEEE Conference on Computer Vision and Pattern Recognition. Jun. 2010. (8 Pages).
Wang, Q., et al. "Justifying the Importance of Color Cues in Object Detection: A Case Study on Pedestrian" The Era of Interactive Media, Springer New York. 2013. (10 Pages).

* cited by examiner

*Primary Examiner* — Bhavesh Mehta
*Assistant Examiner* — Feng Niu
(74) *Attorney, Agent, or Firm* — Tutunjian & Bitetto, P.C.

(57) ABSTRACT

A method and device for extracting color features, relating to the field of image processing includes converting an original image into sub-images corresponding to channels in a color space, dividing the sub-images into a plurality of cells with identical size, and calculating the color histograms of each of the plurality of cells. A cell and neighboring cells thereof are defined as the effective scope of the cell, and a feature vector of the cell is determined according to a degree of similarity of the color histograms of every two neighboring cells in the effective scope. The feature vectors of the cells in the sub-images are concatenated to obtain feature vectors of the sub-images, and a feature vector of the original image is obtained according to the feature vectors of the sub-images.

10 Claims, 6 Drawing Sheets

METHOD AND A DEVICE FOR EXTRACTING COLOR FEATURES

TECHNICAL FIELD

The present invention relates to the field of image processing, and more particularly, to a method and a device for extracting color features.

BACKGROUND OF THE INVENTION

Along with the development of electronic information technology and the popularity of networking, various image collecting devices are widely used in daily life to acquire a large amount of image and video data. To analyze the acquired data quickly and intelligently has become an urgent need in many fields. Therefore, image processing technology has become a hotspot of research. As an essential step in image processing, feature extraction technology has a direct impact on the final performance of the system and has attracted much research interests in recent years. Typically, features include color features, texture features, shape features, and spatial features, etc. Feature extraction is referred to as a method for representing an image block with a multi-dimensional feature vector, and it is used for subsequent processing such as image recognition, etc. Along with the continuous development of the feature extraction technology, the extraction of color features has not been limited to only the shape features of grayscale images; the extraction of multi-color features has also been gradually proposed.

In the prior art, the extraction of color features comprises: first converting an original image into sub-images corresponding to each channel in a color space, dividing each of the sub-images into cells with identical size, and after calculating the color histogram of each cell, taking each cell as the central cell to calculate the similarity values of the color histogram of the central cell and that of each neighboring cell of the central cell, determining the feature vector of each cell according to the calculated similarity value; then concatenating the feature vectors of all the cells in each sub-image to obtain the feature vectors of the sub-image; and finally concatenating the feature vectors of all the sub-images to obtain the feature vector of the whole image.

During the process of realizing the present invention, the inventors found at least the following problems in the prior art:

In prior art, when color features are extracted, the feature vector of each cell is determined by taking said each cell as the center and calculating the similarity values of the color histograms of each cell and that of each neighboring cell of the central cell. The resultant feature vector of the whole image obtained afterwards tends to yield low presentation ability, and exhibit inconsistencies in the presence of the appearance variation of the expressed object. Such deficiencies in feature extraction will result in poor effects in the subsequent feature vector based processing such as image recognition.

BRIEF SUMMARY OF THE INVENTION

To improve the presentation ability of the extracted feature vector during the extraction of the color features, and further enhance the effects of subsequent feature vector based processing such as image recognition, a method and a device for extracting color features are provided in the embodiments of the present invention. The technical solutions are as follows:

One objective of the present invention is to provide a method for extracting color features. Said method comprises:

converting an original image into sub-images corresponding to each of the channels in a color space, dividing said sub-images into a plurality of cells with identical size, and calculating the color histograms of each of said plurality of cells;

defining said cell and the neighboring cells thereof as an effective scope of said cell, and determining the feature vector of said cell according to the degree of similarity of the color histograms of every two neighboring cells in said effective scope;

concatenating the feature vectors of the cells in said sub-images to obtain the feature vectors of said sub-images, and obtaining a feature vector of said original image according to the feature vectors of said sub-images.

Wherein, said determining the feature vector of said cell according to the degree of similarity of the color histograms of every two neighboring cells in said effective scope specifically comprises:

grouping every two neighboring cells in said effective scope into groups according to the direction of adjacency, determining the feature vector of each group according to the degree of similarity of the color histograms of every two neighboring cells in each group, and obtaining the feature vector of said cell according to the feature vector of said each group.

Furthermore, said grouping every two neighboring cells in said effective scope into groups according to the direction of adjacency specifically comprises:

grouping every two neighboring cells of which the direction of adjacency is adjacent on upper and lower positions in said effective scope into a group;

grouping every two neighboring cells of which the direction of adjacency is adjacent on left and right in said effective scope into a group;

grouping every two neighboring cells of which the direction of adjacency is adjacent on upper left and lower right in said effective scope into a group;

grouping every two neighboring cells of which the direction of adjacency is adjacent on lower left and upper right in said effective scope into a group.

Furthermore, before said determining the feature vector of each group according to the degree of similarity of the color histograms of every two neighboring cells in each group, further comprises:

calculating the similarity value or dissimilarity value of the color histograms of every two neighboring cells in said effective scope, and defining said similarity value or dissimilarity value as the degree of similarity of the color histograms of said every two neighboring cells;

said determining the feature vector of each group according to the degree of similarity of the color histograms of every two neighboring cells in each group specifically comprises:

selecting a similarity value smaller than a threshold from each group as the feature vector of each group, or selecting a dissimilarity value greater than a threshold from each group as the feature vector of each group.

Preferably, before concatenating the feature vectors of the cells in said sub-images to obtain the feature vectors of said sub-images, the method further comprises:

normalizing the feature vectors of the cells of said sub-images by taking a preset number of cells as a unit;

said concatenating the feature vectors of the cells in said sub-images to obtain the feature vectors of said sub-images specifically comprises:

concatenating the normalized feature vectors of the cells in said sub-images to obtain the feature vectors of said sub-images.

Another objective of the present invention is to provide a device for extracting color features. Said device comprises:

a conversion module for converting an original image into sub-images corresponding to each of the channels in a color space;

a division module for dividing said sub-images converted by said conversion module into a plurality of cells with identical size;

a calculation module for calculating the color histograms of each of said plurality of cells divided by said division module;

a determining module for defining said cell and the neighboring cells thereof as an effective scope of said cell, determining the feature vector of said cell according to the degree of similarity of the color histograms, obtained by said calculation module, of every two neighboring cells in said effective scope;

a concatenation module for concatenating the feature vectors, determined by said determining module, of the cells in said sub-images to obtain the feature vectors of said sub-images, and obtaining the feature vector of said original image according to the feature vectors of said sub-images.

Furthermore, said determining module specifically comprises:

a grouping unit for grouping every two neighboring cells in said effective scope into groups according to the direction of adjacency;

a first determining unit for determining the feature victor of each group according to the degree of similarity of the color histograms of every two neighboring cells in each group obtained by said grouping unit;

second determining unit for obtaining the feature vector of said cell according to the feature vector of said each group determined by said first determining unit.

Furthermore, said grouping unit is specifically for grouping every two neighboring cells of which the direction of adjacency is adjacent on upper and lower positions in said effective scope into a group; grouping every two neighboring cells of which the direction of adjacency is adjacent on left and right in said effective scope into a group; grouping every two neighboring cells of which the direction of adjacency is adjacent on upper left and lower right in said effective scope into a group; grouping every two neighboring cells of which the direction of adjacency is adjacent on lower left and upper right in said effective scope into a group.

Furthermore, said determining module further comprises:

a calculation unit for calculating the similarity value or dissimilarity value of the color histograms of every two neighboring cells in said effective scope, and defining said similarity value or dissimilarity value as the degree of similarity of the color histograms of said every two neighboring cells;

said first determining unit is specifically for selecting a similarity value smaller than a threshold from each group as the feature vector of each group, or selecting a dissimilarity value greater than a threshold from each group as the feature vector of each group.

Preferably, said device further comprises:

a processing module for normalizing the feature vectors of the cells determined by said determining module by taking a preset number of cells as a unit;

said concatenation module is specifically for concatenating the feature vectors of the cells normalized by said processing module in said sub-images to obtain the feature vectors of said sub-images.

The technical solutions provided by the embodiments of the present invention have the following advantages:

In the present embodiment, a cell and the neighboring cells thereof are defined as the effective scope of the cell, the degree of similarity of the color histograms of every two neighboring cells in the effective scope is calculated, and the feature vector of the cell is determined according to the degree of similarity of the color histograms of every two neighboring cells in the effective scope. The presentation ability of the extracted feature vector is improved and therefore the effects of the subsequent feature vector based processing such as image recognition, etc. is enhanced. In addition, every two neighboring cells in the effective scope are grouped into groups according to the direction of adjacency, and the feature vector of the cell is determined according to the feature vectors of each group, the size of the feature vector of the cell can be reduced effectively and the speed of the subsequent processing is accelerated to meet the requirements for real time processing.

By determining the feature vector of the cell according to a degree of similarity of color histograms of every two neighboring cells in the effective scope, effects of presentation ability of the feature vector and results of performing identification process according to the feature vector are improved.

The method and device provided in the present embodiment can be applied to the field of image processing such as image search, image recognition, or image match, etc.

BRIEF DESCRIPTION OF THE SEVERAL VIEWS OF THE DRAWINGS

The present invention will become more fully understood from the accompanying drawings as below. However, these drawings are only exemplary. Still further variations can be readily obtained by one skilled in the art without burdensome and/or undue experimentation. Such variations are not to be regarded as a departure from the spirit and scope of the invention.

DETAILED DESCRIPTION OF THE INVENTION

To clarify the objectives, technical solutions, and advantages of the present invention, the embodiments of the present invention are further described in detail with the reference to the attached drawings.

Figure 1:
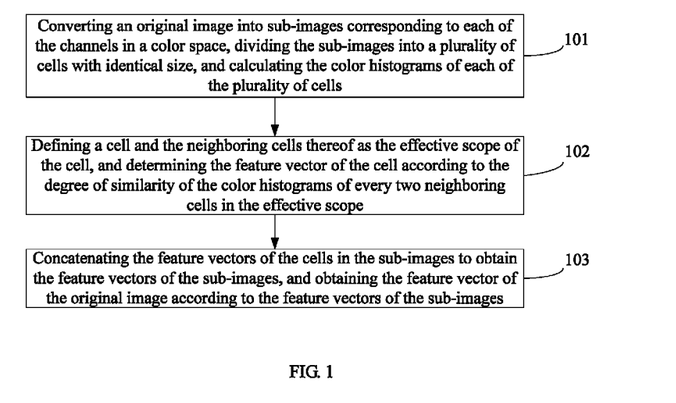
FIG. 1 shows a flowchart of a method for extracting color features provided by an embodiment of the present invention.

A method for extracting color features is provided in the embodiment of the present invention. Referring to FIG. 1, the method provided in the present embodiment comprises:

101: converting an original image into sub-images corresponding to each of the channels in a color space, dividing the sub-images into a plurality of cells with identical size, and calculating the color histograms of each of the plurality of cells;

102: defining a cell and the neighboring cells thereof as the effective scope of the cell, and determining the feature vector of the cell according to the degree of similarity of the color histograms of every two neighboring cells in the effective scope;

103: concatenating the feature vectors of the cells in the sub-images to obtain the feature vectors of the sub-images, and obtaining a feature vector of the original image according to the feature vectors of the sub-images.

Wherein, determining the feature vector of the cell according to the degree of similarity of the color histograms of every two neighboring cells in the effective scope specifically comprises:

grouping every two neighboring cells in the effective scope into groups according to the direction of adjacency, determining the feature vector of each group according to the degree of similarity of the color histograms of every two neighboring cells in each group, and obtaining the feature vector of the cell according to the feature vector of each group.

Furthermore, grouping every two neighboring cells in the effective scope into groups according to the direction of adjacency specifically comprises:

grouping every two neighboring cells of which the direction of adjacency is adjacent on upper and lower positions in the effective scope into a group;

grouping every two neighboring cells of which the direction of adjacency is adjacent on left and right in the effective scope into a group;

grouping every two neighboring cells of which the direction of adjacency is adjacent on upper left and lower right in the effective scope into a group;

grouping every two neighboring cells of which the direction of adjacency is adjacent on lower left and upper right in the effective scope into a group.

Furthermore, before determining the feature vector of each group according to the degree of similarity of the color histograms of every two neighboring cells in each group, the method further comprises:

calculating the similarity value or dissimilarity value of the color histograms of every two neighboring cells in the effective scope, and defining the similarity value or dissimilarity value as the degree of similarity of the color histograms of every two neighboring cells;

determining the feature vector of each group according to the degree of similarity of the color histograms of every two neighboring cells in each group specifically comprises:

selecting a similarity value smaller than a threshold from each group as the feature vector of each group, or selecting a dissimilarity value greater than a threshold from each group as the feature vector of each group;

determining the feature vector of each group according to the degree of similarity of the color histograms of every two neighboring cells in each group specifically comprises:

selecting a similarity value smaller than a threshold from each group as the feature vector of each group, or selecting a dissimilarity value greater than a threshold from each group as the feature vector of each group.

Preferably, before concatenating the feature vectors of the cells in the sub-images to obtain the feature vectors of the sub-images, the method further comprises:

normalizing the feature vectors of the cells of the sub-images by taking a preset number of cells as a unit;

concatenating the feature vectors of the cells in the sub-images to obtain the feature vectors of the sub-images, which specifically comprises:

concatenating the normalized feature vectors of the cells in the sub-images to obtain the feature vectors of the sub-images.

In the present embodiment, a cell and the neighboring cells thereof are defined as the effective scope of the cell, the degree of similarity of the color histograms of every two neighboring cells in the effective scope is calculated, and the feature vector of the cell is determined according to the degree of similarity of the color histograms of every two neighboring cells in the effective scope. The presentation ability of the extracted feature vector is improved and therefore the effects of the subsequent feature vector based processing such as image recognition, etc. is enhanced. In addition, every two neighboring cells in the effective scope are grouped into groups according to the direction of adjacency, and the feature vector of the cell is determined according to the feature vectors of each group, the size of the feature vector of the cell can be reduced effectively and the speed of the subsequent processing is accelerated to meet the requirements for real time processing.

Figure 2:
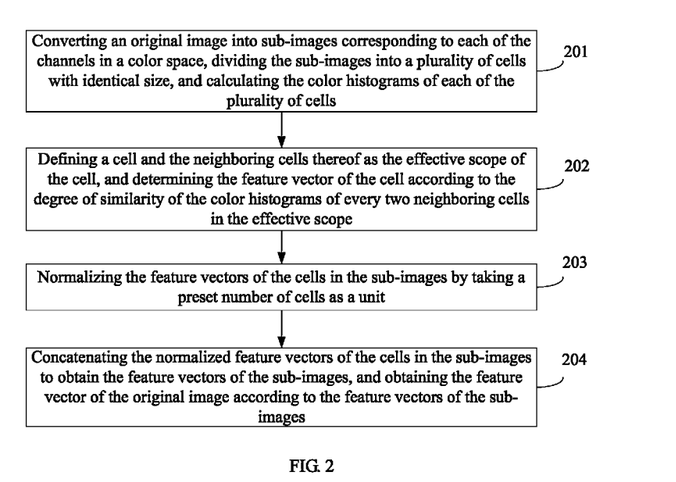
FIG. 2 shows a flowchart of a method for extracting color features provided by another embodiment of the present invention.

To clarify the method for extracting color features provided in the above mentioned embodiment, the method for extracting color features is described in detail by taking the following embodiment as an example with reference to the above mentioned contents. Refer to the following embodiment for details:

In another embodiment of the present invention, a method for extracting color features is provided. To facilitate better description, the method is described in detail by taking the process of extracting color features from an original image with a dimension of 128*64 as an example with reference to the contents in the above mentioned embodiment. Referring to FIG. 2, the method provided in the present embodiment specifically comprises:

201: Converting an original image into sub-images corresponding to each of the channels in a color space, dividing the sub-images into a plurality of cells with identical size, and calculating the color histograms of each of the plurality of cells;

In this step, the color space includes, but is not limited to a RGB color space containing three channels of a R (Red) channel, a G (Green) channel, and a B (Blue) channel, a HIS color space containing three channels of a H (Hue) channel, a S (Saturation) channel and an I (Intensity) channel, and a HSV color space containing three channels of a H (Hue) channel, a S (Saturation) channel and a V (Value) channel, etc. There is no limitation on which type of color space is adopted in this step in the present embodiment. Different color spaces correspond to different channels. Each color channel stores the information of the color elements in the image. Colors in all the color channels are overlaid and mixed to generate the colors of the pixels in the image. To facilitate better description, the method for extracting color features is described by only taking an exemplary process of converting an original image into sub-images corresponding to each of the channels in the HSV color space in this step.

Figure 3:
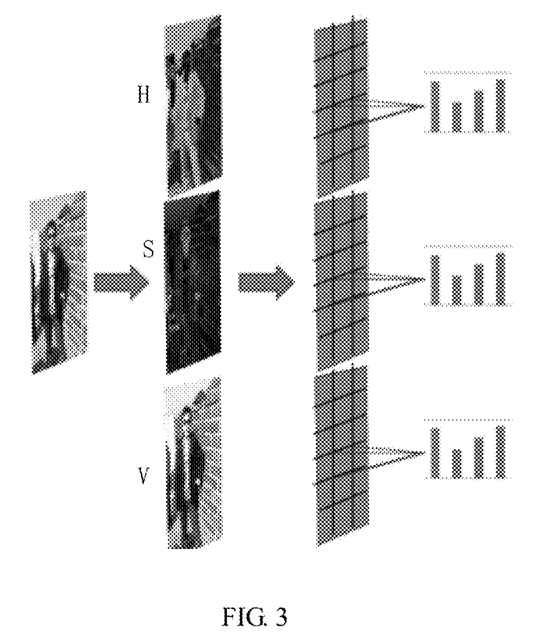
FIG. 3 shows a schematic diagram of conversion of a color space provided by another embodiment of the present invention.

Here, in the three channels of H, S and V contained in HSV color space, H channel is hue channel, it is also called tone channel, which is used to represent the color appearance and is not related to the brightness of the image; S channel is saturation channel, which is used to distinguish the purity of the image color; V channel is value channel, which is used to represent the brightness of the image, the value increases when the color approaches white and decreases when the color approaches gray or black. Converting an original image into sub-images corresponding to each of the channels in the HSV color space means converting the original image into a sub-image corresponding to the H channel of the HSV color space, a sub-image corresponding to the S channel of the HSV color space and a sub-image corresponding to the V channel of the HSV color space. Refer to FIG. 3 for a schematic diagram of the conversion. Conversion can be realized using various existing techniques in the art. There is no limitation in this aspect in the present embodiment.

After the original image is converted into the sub-images corresponding to each of the channels in the color space, each sub-image is divided into cells with identical size, and the color histogram of the cell is calculated. There is no limitation on the size of the divided cells in the present embodiment. For example, an image cell with a size of 128*64 can be divided into 128 cells with a size of 8*8. For each divided cell, the numerical value of its color histogram is a quantitative measure of the color in the image, such as the ratio of different colors to the colors in the whole image. The frequency that a certain color value occurs can reflect the statistic distribution and the basic hue of the image color. In such a way, a corresponding histogram for each cell can be obtained, as shown in the bar chart on the right side of the FIG. 3. The color histograms of the cells can be calculated by trilinear interpolation. The methods for calculating the color histogram are very mature and therefore will not be described in detail in the present embodiment. Various existing methods for calculating the color histograms can be used.

Figure 4:
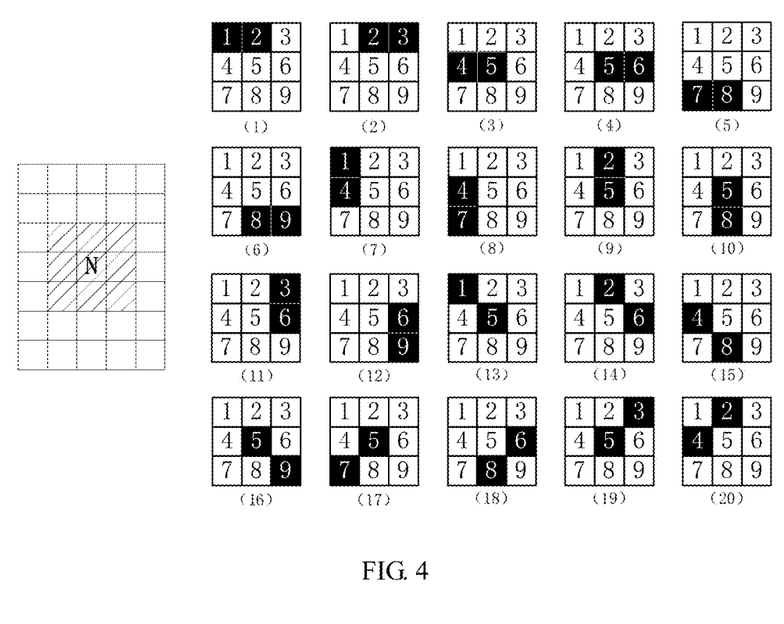
FIG. 4 shows a schematic diagram of neighboring cells provided by another embodiment of the present invention.

202: Defining a cell and the neighboring cells thereof as the effective scope of the cell, and determining the feature vector of the cell according to the degree of similarity of the color histograms of every two neighboring cells in the effective scope;

For this step, the present embodiment is described by an exemplary process of determining the feature vector of cell N on the left side of FIG. 4. For cell N as shown in FIG. 4, when cell N and its neighboring cells are defined as the effective scope of cell N, the effective scope of cell N is illustrated by 3*3 cells centered around cell N, as shown by the shadow cell in FIG. 4. To facilitate better description, the 3*3 cells are marked with the number 1-9; every two neighboring cells are filled with black color; then there are 20 combinations of every two neighboring cells in the effective scope of cell N formed by the 3*3 cells, as shown on the right side of the FIG. 4. Wherein, the direction of adjacency of the two cells shown in (1) to (6) is adjacent on left and right; that of the two cells shown in the (7) to the (12) is adjacent on the upper and lower; that of the two cells shown in the (13) to the (16) is adjacent on the upper left and lower right; and that of the two cells shown in the (17) to the (20) is adjacent on the lower left and upper right.

In the case of 20 combinations of neighboring cells as shown in FIG. 4, when the feature vector of the cell N is being determined according to the degree of similarity of the color histograms of every two neighboring cells in the effective scope of the cell N, the similarity value of the color histograms of every two neighboring cells in the effective scope can be calculated to represent the degree of similarity of every two neighboring cells, and then the feature vector of the cell N can be determined according to the calculated similarity values. Or, the dissimilarity value of the color histograms of every two neighboring cells in the effective scope can be calculated to represent the degree of similarity of every two neighboring cells, and then the feature vector of the cell N can be determined according to the calculated dissimilarity values. In the case of either, the similarity value or the dissimilarity value is adopted to represent the degree of similarity, there are 20 combinations of neighboring cells, and the degree of similarity corresponding to each cell can be obtained, therefore the dimension of the feature vector of each cell is 20. As an example, for the original image with a dimension of 128*64, it can be divided into three sub-images, each including 128 cells with a dimension of 8*8, so the dimension of the feature vector of each sub-image of the original image is 2,560, and the dimension of the feature vector of the original image formed by the three sub-images is 7,680.

Preferably, in order to reduce the dimension of the feature vector of the image, when determining the feature vector of the cell according to the degree of similarity of the color histograms of every two neighboring cells in the effective scope, other than supporting the way of defining the degree of similarity of the neighboring cells as a feature vector of the cell, the method provided in the present embodiment also supports the way of grouping every two neighboring cells into groups and selecting one or more degree of similarity from each group to represent the feature vector of the cell so as to reduce the dimension. This way of determining the feature vector of the cell is described by taking the combination of the neighboring cells in FIG. 4 again as an example. The neighboring cells can be represented by the direction of adjacency, therefore determining the feature vector of the cell according to the degree of similarity of the color histograms of every two neighboring cells in the effective scope specifically comprises:

grouping every two neighboring cells in the effective scope into groups according to the direction of adjacency, determining the feature vector of each group according to the degree of similarity of the color histograms of every two neighboring cells in each group, and obtaining the feature vector of the cell according to the feature vector of each group.

When grouping every two neighboring cells in the effective scope into groups according to the direction of adjacency, the following steps can be followed:

grouping every two neighboring cells of which the direction of adjacency is adjacent on upper and lower in the effective scope into a group;

grouping every two neighboring cells of which the direction of adjacency is adjacent on left and right in the effective scope into a group;

grouping every two neighboring cells of which the direction of adjacency is adjacent on upper left and lower right in the effective scope into a group;

grouping every two neighboring cells of which the direction of adjacency is adjacent on lower left and upper right in the effective scope into a group.

Figure 5:
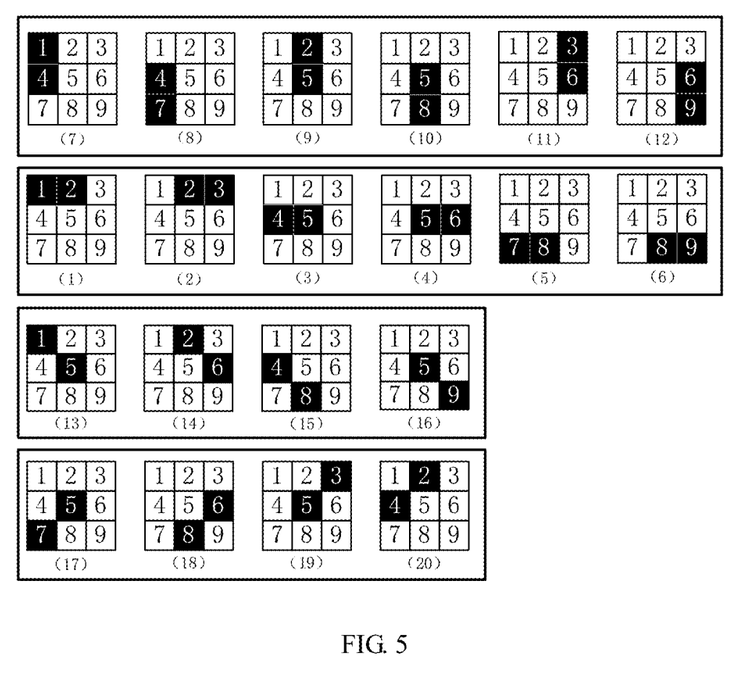
FIG. 5 shows a schematic diagram of division of neighboring cells provided by another embodiment of the present invention.

FIG. 5 illustrates the situation after grouping, wherein the direction of adjacency of the two cells shown in (1) to (6) is adjacent on left and right; that of the two cells shown in the (7) to the (12) is adjacent on the upper and lower and divided into a group; that of the two cells shown in the (13) to the (16) is adjacent on the left upper and right lower; and that of the two cells shown in the (17) to the (20) is adjacent on the left lower and right upper.

Therefore, (1) to (6) are grouped as a group; (7) to (12) are grouped as a group; (13) to (16) are grouped as a group; (17) to (20) are grouped as a group. In addition to the above mentioned way of grouping according to the direction of adjacency, other ways of grouping can also be adopted. There is no limitation on how to group in the present embodiment.

The degree of similarity can be represented by similarity value or dissimilarity value, therefore before determining the feature vector of each group according to the degree of similarity of the color histograms of every two neighboring cells in each group, the method further comprises:

calculating the similarity value or dissimilarity value of the color histograms of every two neighboring cells in the effective scope, and defining the similarity value or dissimilarity value as the degree of similarity of the color histograms of every two neighboring cells.

Correspondingly, determining the feature vector of each group according to the degree of similarity of the color histograms of every two neighboring cells in each group specifically comprises:

selecting a similarity value smaller than a threshold from each group as the feature vector of each group, or selecting a dissimilarity value greater than a threshold from each group as the feature vector of each group.

It should be noted that the similarity value or dissimilarity value of the color histograms of every two neighboring cells in the effective scope can be calculated during or after the grouping. There is no limitation on the sequence of the calculation and the grouping in the present embodiment.

In actual application, the threshold of the similarity value or dissimilarity value can be determined according to the training experience value or other ways. There is no limitation on the way of determining the threshold and the value of the determined threshold in the present embodiment. Moreover, the minimum similarity value or the maximum dissimilarity value can be selected from each group as the feature vector of each group. If the similarity value is used to represent the degree of similarity, then the similarity value of each combination of neighboring cells can be calculated by the following formula:

$$S_x = sim(group_i, group_j)_x, i=1,2,3,4,5,6,7,8,9; j=1,2,3,4,5,6,7,8,9; i \neq j$$

Whereas, there are 20 combinations of every two neighboring cells, as shown in FIG. 4, x represents the similarity value of any one of the 20 combinations, then x is an arbitrary value among 1 to 20; $S_x$ represents the similarity value of the $x^{th}$ combination of neighboring cells; $group_i$ represents the color histogram of the $i^{th}$ cell in the effective scope; $group_j$ represents the color histogram of the $j^{th}$ cell in the effective scope; and $sim(group_i, group_j)$ represents calculating the similarity value of the color histogram of the $i^{th}$ cell and the color histogram of the $j^{th}$ cell. For each cell, the minimum similarity value is selected from each group as the feature vector of each group, the feature vector of each cell specifically can be calculated by the following formula:

$$T_n = \{f_1, f_2, f_3, f_4\}, f_1 = \{S_7, S_8, S_9, S_{10}, S_{11}, S_{12}\}_{min}, f_2 = \{S_1, S_2, S_3, S_4, S_5, S_6\}_{min}, f_3 = \{S_{13}, S_{14}, S_{15}, S_{16}\}_{min}, f_4 = \{S_{17}, S_{18}, S_{19}, S_{20}\}_{min}$$

Wherein, n represents the $n^{th}$ cell of all cells, and n is greater than 1 and smaller or equal to the number of the cells; $T_n$ represents the feature vector of the $n^{th}$ cell; $f_1, f_2, f_3,$ and $f_4$ represent the feature vectors of each group, as shown in FIG. 4 or 5, $\{S_7, S_8, S_9, S_{10}, S_{11}, S_{12}\}_{min}$ represents the minimum similarity value of the combinations of neighboring cells shown in (7), (8), (9), (10), (11) and (12); $\{S_1, S_2, S_3, S_4, S_5, S_6\}_{min}$ represents the minimum similarity value of the combinations of neighboring cells shown in (1), (2), (3), (4), (5) and (6); $\{S_{17}, S_{18}, S_{19}, S_{20}\}_{min}$ represents the minimum similarity value of the combinations of neighboring cells shown in (17), (18), (19) and (20); and $\{S_{13}, S_{14}, S_{15}, S_{16}\}_{min}$ represents the minimum similarity value of the combinations of neighboring cells shown in (13), (14), (15) and (16).

If the dissimilarity value is used for representing the degree of similarity, then the dissimilarity value of each combination of neighboring cells can be calculated by the following formula:

$$DS_x = dissim(group_i, group_j)_x, i=1,2,3,4,5,6,7,8,9; j=1,2,3,4,5,6,7,8,9; i \neq j$$

Whereas, there are 20 combinations of every two neighboring cells, as shown in FIG. 4; x represents the similarity value of any one of the 20 combinations, then x is an arbitrary value among 1 to 20; $DS_x$ represents the dissimilarity value of the $x^{th}$ combination of neighboring cells; $group_i$ represents the color histogram of the $i^{th}$ cell in the effective scope; $group_j$ represents the color histogram of the $j^{th}$ cell in the effective scope; and $dissim(group_i, group_j)$ represents calculating the dissimilarity value of the color histogram of the $i^{th}$ cell and the color histogram of the $j^{th}$ cell. For each cell, the maximum dissimilarity value is selected from each group as the feature vector of each group, the feature vector of each cell specifically can be calculated by the following formula:

$$T_n = \{f_1', f_2', f_3', f_4'\}, f_1' = \{DS_7, DS_8, DS_9, DS_{10}, DS_{11}, DS_{12}\}_{max}, f_2' = \{DS_1, DS_2, DS_3, DS_4, DS_5, DS_6\}_{max}, f_3' = \{DS_{13}, DS_{14}, DS_{15}, DS_{16}\}_{max}, f_4' = \{DS_{17}, DS_{18}, DS_{19}, DS_{20}\}_{max}$$

Wherein, n represents the $n^{th}$ cell of all cells, and n is greater than 1 and smaller or equal to the number of the cells; $T_n$ represents the feature vector of the $n^{th}$ cell; $f_1', f_2', f_3'$ and $f_4'$ represent the feature vectors of each group, as shown in FIG. 4 or 5, $\{DS_7, DS_8, DS_9, DS_{10}, DS_{11}, DS_{12}\}_{max}$ represents the maximum dissimilarity value of the combinations of neighboring cells shown in (7), (8), (9), (10), (11) and (12); $\{DS_1, DS_2, DS_3, DS_4, DS_5, DS_6\}_{max}$ represents the maximum dissimilarity value of the combinations of neighboring cells shown in (1), (2), (3), (4), (5) and (6); $\{DS_{17}, DS_{18}, DS_{19}, DS_{20}\}_{max}$ represents the maximum dissimilarity value of the combinations of neighboring cells shown in (17), (18), (19) and (20); and $\{DS_{13}, DS_{14}, DS_{15}, DS_{16}\}_{max}$ represents the maximum dissimilarity value of the combinations of neighboring cells shown in (13), (14), (15) and (16).

In the present embodiment, there is no limitation on whether the dissimilarity value or the similarity value is adopted to represent the degree of similarity. The feature vectors of all the cells in the sub-images can be determined according to the above mentioned way of determining the feature vector of the cell N. A cell may correspond to 4 groups, therefore after the minimum similarity value or the maximum dissimilarity value is selected from each group as the feature vector of the group, the dimension of the feature vector of the cell is reduced from the original 20 to 4, the dimension of the feature vector of each sub-image is reduced from the original 2,560 to 512, and the dimension of the feature vector of the original image is reduced from the original 7,680 to 1,536. Thus, it can be seen that the grouping can reduce the dimension of the feature vector of the original image so as to accelerate the subsequent computation according to the feature vector.

Figure 6:
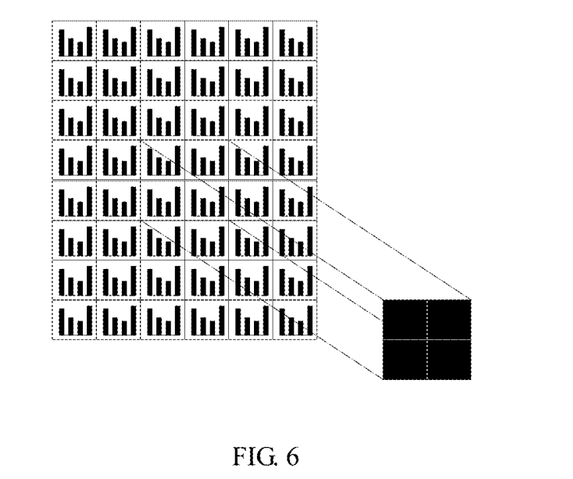
FIG. 6 shows a schematic diagram of a normalized cell provided by another embodiment of the present invention.

203: Normalizing the feature vectors of the cells in the sub-images by taking a preset number of cells as a unit;

This step is an optional step. There is no limitation on the preset number in the present embodiment. Referring to the schematic diagram of feature extraction in FIG. 6, the process of normalizing the feature vectors of the cells in the sub-images using 2*2 cells as a unit is shown according to one aspect of the present embodiment. In actual application, L2 normalization or other ways of normalization can be adopted, and there is no limitation on the specific ways of normalization in the present embodiment.

204: Concatenating the normalized feature vectors of the cells in the sub-images to obtain the feature vectors of the sub-images, and obtaining the feature vector of the original image according to the feature vectors of the sub-images.

Figure 7:
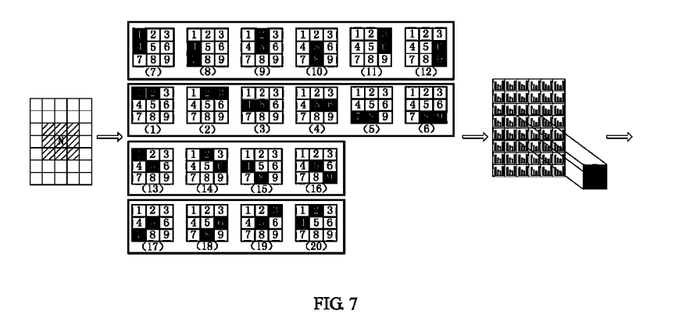
FIG. 7 shows a schematic diagram of a process of extracting color features provided by another embodiment of the present invention.

The specific process of extracting the color features provided in the present embodiment is shown in FIG. 7. After the feature vector of each cell is obtained in step 202 and normalized in step 203, the feature vector of the sub-image can be obtained by concatenating the normalized feature vectors of the cells in the sub-images, and then the feature vector of the original image can be obtained by concatenating the feature vectors of all sub-images. There is no limitation on the ways of concatenating the feature vectors of the normalized cells in the sub-images and the ways of concatenating the feature vectors of all the sub-images in the present embodiment.

In the present embodiment, a cell and the neighboring cells thereof are defined as the effective scope of the cell, the degree of similarity of the color histograms of every two neighboring cells in the effective scope is calculated, and the feature vector of the cell is determined according to the degree of similarity of the color histograms of every two neighboring cells in the effective scope. The presentation ability of the extracted feature vector is improved and, therefore, the effects of the subsequent feature vector based processing such as image recognition etc. can be enhanced. In addition, every two neighboring cells in the effective scope are grouped into groups according to the direction of adjacency, and the feature vector of the cell is determined according to the feature vectors of each group, the size of the feature vector of the cell can be reduced effectively and the speed of the subsequent processing is accelerated to meet the requirements for real time processing.

Figure 8:
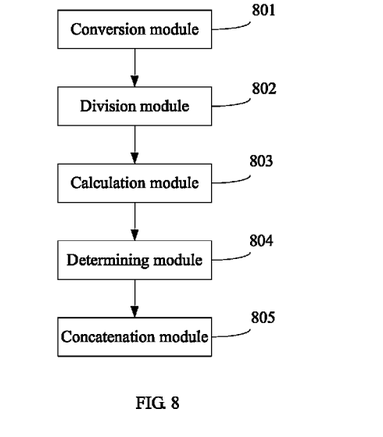
FIG. 8 shows a structural diagram of a device for extracting color features provided by another embodiment of the present invention.

A device for extracting color features is provided in another embodiment of the present invention. The device is used for executing the method for extracting color features provided in the above mentioned embodiment. Referring to FIG. 8, the device comprises:

a conversion module 801 for converting an original image into sub-images corresponding to each of the channels in a color space;

a division module 802 for dividing the sub-images converted by the conversion module 801 into a plurality of cells with identical size;

a calculation module 803 for calculating the color histograms of each of the plurality of cells divided by the division module 802;

a determining module 804 for defining a cell and the neighboring cells thereof as the effective scope of the cell, determining the feature vector of the cell according to the degree of similarity of the color histograms, obtained by the calculation module 803, of every two neighboring cells in the effective scope;

a concatenation module 805 for concatenating the feature vectors, determined by the determining module 804, of the cells in the sub-images to obtain the feature vectors of the sub-images, and obtaining the feature vector of the original image according to the feature vectors of the sub-images.

Wherein, referring to step 201 for related description of the means that the conversion module 801 converts the original image into sub-images corresponding to each of the channels in a color space, the means that the division module 802 divides the converted sub-images into a plurality of cells with identical size, and the means that the calculation module 803 calculates the color histograms of each of the plurality of cells divided by the division module 802, details thereof are omitted.

Figure 9:
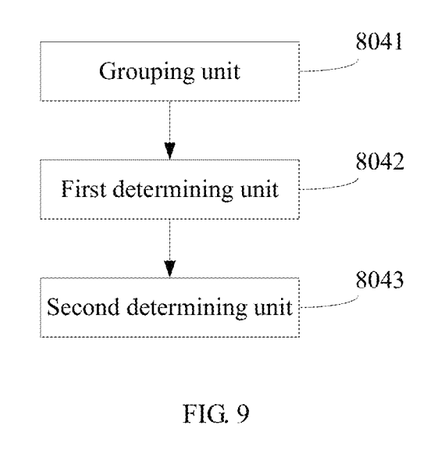
FIG. 9 shows a structural diagram of a determining module provided by another embodiment of the present invention.

Furthermore, referring to FIG. 9, the determining module 804 specifically comprises:

a grouping unit 8041 for grouping every two neighboring cells in the effective scope into groups according to the direction of adjacency;

a first determining unit 8042 for determining the feature vector of each group according to the degree of similarity of the color histograms of every two neighboring cells in each group obtained by the grouping unit 8041;

a second determining unit 8043 for obtaining the feature vector of the cell according to the feature vector of each group determined by the first determining unit 8042.

Furthermore, the grouping unit 8041 is specifically for grouping every two neighboring cells of which the direction of adjacency is adjacent on upper and lower in the effective scope into a group; grouping every two neighboring cells of which the direction of adjacency is adjacent on left and right in the effective scope into a group; grouping every two neighboring cells of which the direction of adjacency is adjacent on upper left and lower right in the effective scope into a group; grouping every two neighboring cells of which the direction of adjacency is adjacent on lower left and upper right in the effective scope into a group.

See related description in step 202 in the above mentioned embodiment for the grouping means of the grouping unit 8041.

Figure 10:
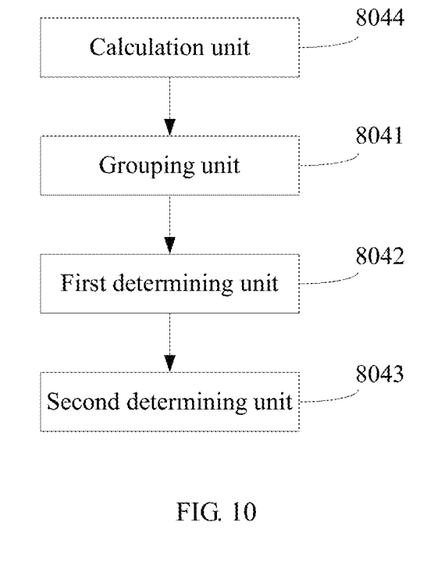
FIG. 10 shows a structural diagram of another determining module provided by another embodiment of the present invention.

Furthermore, referring to FIG. 10, the determining module 804 further comprises:

a calculation unit 8044 for calculating the similarity value or dissimilarity value of the color histograms of every two neighboring cells in the effective scope, and defining the similarity value or dissimilarity value as the degree of similarity of the color histograms of the every two neighboring cells;

the first determining unit 8042 is specifically for selecting a similarity value smaller than a threshold from each group as the feature vector of each group, or selecting a dissimilarity value greater than a threshold from each group as the feature vector of each group.

It should be noted that the calculation unit 8044 can execute the calculation operation before and after the grouping unit 8041 performs grouping. The present embodiment has no limitation on the operation sequence of the calculation unit 8044 and the grouping unit 8041. The present embodiment only uses the sequence as shown in FIG. 10 as an example for description.

Figure 11:
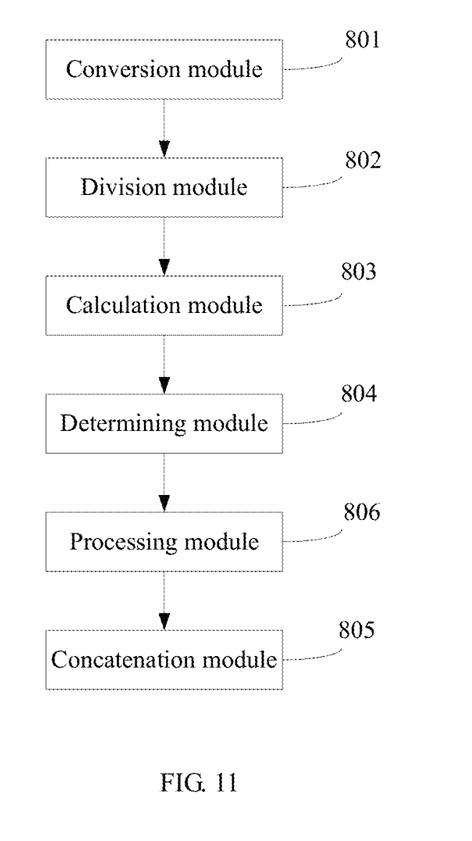
FIG. 11 shows a structural diagram of another device for color extraction provided by another embodiment of the present invention.

Referring to FIG. 11, the device further comprises:

a processing module 806 for normalizing the feature vectors of the cells determined by the determining module 804 by taking a preset number of cells as a unit;

the concatenation module 805 is specifically for concatenating the feature vectors of the cells normalized by the processing module 806 in the sub-images to obtain the feature vectors of the sub-images.

Referring to step 203 in the above mentioned embodiment for related description of the means that the processing module 806 performs normalization on the feature vectors of the cells, details thereof are omitted.

In the present embodiment, a cell and the neighboring cells thereof are defined as the effective scope of the cell, the degree of similarity of the color histograms of every two neighboring cells is calculated in the effective scope, and the feature vector of the cell is determined according to the degree of similarity of the color histograms of every two neighboring cells in the effective scope. The presentation ability of the extracted feature vector is improved, and therefore the effects of the subsequent feature vector based on processing such as image recognition, etc. can be enhanced. In addition, every two neighboring cells in the effective scope are grouped into groups according to the direction of adjacency, and the feature vector of the cell is determined according to the feature vectors of each group, the size of the feature vector of the cell can be reduced effectively and the speed of the subsequent processing is accelerated to meet the requirements for real time processing.

It should be noted that when the device provided in the above mentioned embodiment is used to extract the color features, the above mentioned functional modules is only used as an example. For example, in another use, the above mentioned functions can be realized by different functional modules according to a user's needs, which means that the internal structure of the device can be re-arranged into different functional modules to complete all or part of the above mentioned functions. Besides, the device for extracting color features in the above mentioned embodiment shares the same concept with the method for extracting color features in the above mentioned embodiments, and the more details about the realization process can be seen in the embodiments of method, and will not be described further.

Those ordinarily skilled in this field can understand that all or part of the steps for realizing the above mentioned embodiments can be completed by hardware or by the related hardware under the direction of the program; said program can be stored in a readable memory media which may be a ROM, a disc or an optical disc.

The above mentioned descriptions are exemplary embodiments of the present invention, which cannot limit the present invention. Within the spirit and principle of the present invention, any modification, equivalent substitution or improvement all shall be included in the protection scope of the present invention.

What is claimed is:

1. A method for extracting color features, comprising:
    converting an original image into sub-images corresponding to each channel in a color space, dividing said sub-images into a plurality of cells with identical size, and calculating color histograms of each of said plurality of cells;
    defining a cell and neighboring cells thereof as an effective scope of said cell, and determining a feature vector of said cell according to a degree of similarity of the color histograms of every two neighboring cells in said effective scope; and
    concatenating the feature vectors of the cells in said sub-images to obtain feature vectors of said sub-images, and obtaining a feature vector of said original image according to the feature vectors of said sub-images.

2. The method according to claim 1, wherein said determining the feature vector of said cell according to the degree of similarity of the color histograms of every two neighboring cells in said effective scope specifically comprises:
    grouping every two neighboring cells in said effective scope into groups according to a direction of adjacency, determining a feature vector of each group according to a degree of similarity of the color histograms of every two neighboring cells in each group, and obtaining the feature vector of said cell according to the feature vector of said each group.

3. The method according to claim 2, wherein said grouping every two neighboring cells in said effective scope into groups according to the direction of adjacency specifically comprises:
    grouping every two neighboring cells, of which the direction of adjacency is upper and lower adjacent, in said effective scope into a group;
    grouping every two neighboring cells of which the direction of adjacency is adjacent on left and right in said effective scope into a group;
    grouping every two neighboring cells of which the direction of adjacency is adjacent on upper left and lower right in said effective scope into a group; and
    grouping every two neighboring cells of which the direction of adjacency is adjacent on lower left and upper right in said effective scope into a group.

4. The method according to claim 2, wherein before said determining the feature vector of each group according to the degree of similarity of the color histograms of every two neighboring cells in each group, further comprises:
    calculating a similarity value or dissimilarity value of the color histograms of every two neighboring cells in said effective scope, and defining said similarity value or dissimilarity value as the degree of similarity of the color histograms of said every two neighboring cells; and
    said determining the feature vector of each group according to the degree of similarity of the color histograms of every two neighboring cells in each group specifically comprises:
    selecting a similarity value smaller than a threshold from each group as the feature vector of each group, or selecting a dissimilarity value greater than a threshold from each group as the feature vector of each group.

5. The method according to claim 1, wherein before said concatenating the feature vectors of the cells in said sub-images to obtain the feature vectors of said sub-images, the method further comprises:
    normalizing the feature vectors of the cells of said sub-images by taking a preset number of cells as a unit; and
    said concatenating the feature vectors of the cells in said sub-images to obtain the feature vectors of said sub-images specifically comprises:
    concatenating the normalized feature vectors of the cells in said sub-images to obtain the feature vectors of said sub-images.

6. A non-transitory computer readable storage medium comprising a computer readable program for extracting color features, wherein the computer readable program when executed on a computer causes the computer to perform the steps of:
    converting an original image into sub-images corresponding to each channel in a color space;
    dividing said sub-images converted by said converting into a plurality of cells with identical size;
    calculating the color histograms of each of said plurality of cells divided by said dividing;
    defining said cell and the neighboring cells thereof as an effective scope of said cell, determining a feature vector of said cell according to a degree of similarity of the color histograms, obtained by said calculating, of every two neighboring cells in said effective scope; and
    concatenating the feature vectors, determined by said defining, of the cells in said sub-images to obtain feature vectors of said sub-images, and obtaining a feature vector of said original image according to the feature vectors of said sub-images.

7. The computer readable storage medium according to claim 6, wherein said defining specifically comprises:
grouping every two neighboring cells in said effective scope into groups according to a direction of adjacency;
determining a feature vector of each group according to a degree of similarity of the color histograms of every two neighboring cells in each group obtained by said grouping unit; and
obtaining the feature vector of said cell according to a feature vector of said each group determined by said first determining unit.

8. The computer readable storage medium according to claim 7, wherein said grouping is specifically for grouping every two neighboring cells of which the direction of adjacency is adjacent on upper and lower positions in said effective scope into a group; grouping every two neighboring cells of which the direction of adjacency is adjacent on left and right in said effective scope into a group; grouping every two neighboring cells of which the direction of adjacency is adjacent on upper left and lower right in said effective scope into a group; grouping every two neighboring cells of which the direction of adjacency is adjacent on lower left and upper right in said effective scope into a group.

9. The computer readable storage medium according to claim 7, wherein said defining further comprises:
computing a similarity value or dissimilarity value of the color histograms of every two neighboring cells in said effective scope, and defining said similarity value or dissimilarity value as a degree of similarity of the color histograms of said every two neighboring cells;
said determining a feature vector is specifically for selecting a similarity value smaller than a threshold from each group as the feature vector of each group, or selecting a dissimilarity value greater than a threshold from each group as the feature vector of each group.

10. The computer readable storage medium according to claim 6, wherein said device further comprises:
normalizing the feature vectors of the cells determined by said defining by taking a preset number of cells as a unit;
said concatenating is specifically for concatenating the feature vectors of the cells normalized by said normalizing in said sub-images to obtain the feature vectors of said sub-images.

* * * * *